United States Patent
Schierle et al.

(10) Patent No.: US 12,053,721 B2
(45) Date of Patent: Aug. 6, 2024

(54) DEFOAMER COMPOSITION BASED ON ORGANOFUNCTIONALLY MODIFIED POLYSILOXANES

(71) Applicant: Evonik Operations GmbH, Essen (DE)

(72) Inventors: Thorsten Schierle, Essen (DE); Philippe Favresse, Ratingen (DE); Michael Ferenz, Essen (DE); Frank Schubert, Neukirchen-Vluyn (DE); Alexander Schulz, Essen (DE); Michael Gippert, Essen (DE); Tim Luca Wessiepe, Essen (DE)

(73) Assignee: Evonik Operations GmbH, Essen (DE)

( * ) Notice: Subject to any disclaimer, the term of this patent is extended or adjusted under 35 U.S.C. 154(b) by 455 days.

(21) Appl. No.: 17/399,276

(22) Filed: Aug. 11, 2021

(65) Prior Publication Data

US 2022/0047969 A1 Feb. 17, 2022

(30) Foreign Application Priority Data

Aug. 14, 2020 (EP) ..................... 20191077

(51) Int. Cl.
*B01D 19/04* (2006.01)
(52) U.S. Cl.
CPC ................. *B01D 19/0409* (2013.01)
(58) Field of Classification Search
None
See application file for complete search history.

(56) References Cited

U.S. PATENT DOCUMENTS

| | | |
|---|---|---|
| 6,420,324 B1 | 7/2002 | Ebbrecht et al. |
| 6,552,092 B2 | 4/2003 | Ebbrecht et al. |
| 7,442,724 B2 | 10/2008 | Esselborn et al. |
| 7,598,334 B2 | 10/2009 | Ferenz et al. |
| 7,605,284 B2 | 10/2009 | Brueckner et al. |
| 7,635,581 B2 | 12/2009 | Ferenz et al. |
| 7,727,599 B2 | 6/2010 | Doehler et al. |
| 7,776,989 B2 | 8/2010 | Ferenz et al. |
| 7,825,207 B2 | 11/2010 | Ferenz et al. |
| 7,834,122 B2 | 11/2010 | Ferenz et al. |
| 7,838,603 B2 | 11/2010 | Schwab et al. |
| 7,855,265 B2 | 12/2010 | Thum et al. |
| 7,893,128 B2 | 2/2011 | Busch et al. |

(Continued)

FOREIGN PATENT DOCUMENTS

| | | | |
|---|---|---|---|
| CA | 2135420 | * 6/1995 | ............ B01D 19/04 |
| CN | 1112586 | 11/1995 | |

(Continued)

OTHER PUBLICATIONS

European Search Report issued Jan. 7, 2022 in European Application No. 21190044.4, 5 pages.

(Continued)

*Primary Examiner* — Jason M Greene
(74) *Attorney, Agent, or Firm* — Grüneberg and Myers PLLC

(57) ABSTRACT

A defoamer composition based on organofunctionally modified polysiloxanes contains one or more laterally polyether-modified polysiloxanes as component A and at least one terminally polyether-modified polysiloxane as component B.

21 Claims, 3 Drawing Sheets

(56) References Cited

U.S. PATENT DOCUMENTS

| | | |
|---|---|---|
| 7,964,694 B2 | 6/2011 | Ferenz et al. |
| 8,030,366 B2 | 10/2011 | Ferenz et al. |
| 8,138,294 B2 | 3/2012 | Henning et al. |
| 8,172,936 B2 | 5/2012 | Herrwerth et al. |
| 8,198,473 B2 | 6/2012 | Ferenz et al. |
| 8,211,972 B2 | 7/2012 | Meyer et al. |
| 8,247,525 B2 | 8/2012 | Schubert et al. |
| 8,268,939 B2 | 9/2012 | Ebbrecht et al. |
| 8,283,422 B2 | 10/2012 | Schubert et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,420,567 B1 | 4/2013 | Naumann et al. |
| 8,420,748 B2 | 4/2013 | Henning et al. |
| 8,450,514 B2 | 5/2013 | Schubert et al. |
| 8,455,603 B2 | 6/2013 | Ferenz et al. |
| 8,466,248 B2 | 6/2013 | Meyer et al. |
| 8,476,189 B1 | 7/2013 | Naumann et al. |
| 8,486,677 B2 | 7/2013 | Thum et al. |
| 8,557,944 B2 | 10/2013 | Henning et al. |
| 8,617,529 B2 | 12/2013 | Herrwerth et al. |
| 8,685,376 B2 | 4/2014 | Czech et al. |
| 8,729,207 B2 | 5/2014 | Hartung et al. |
| 8,772,423 B2 | 7/2014 | De Gans et al. |
| 8,778,319 B2 | 7/2014 | Herrwerth et al. |
| 8,779,079 B2 | 7/2014 | Henning et al. |
| 8,796,000 B2 | 8/2014 | Thum et al. |
| 8,802,744 B2 | 8/2014 | Knott et al. |
| 8,841,400 B2 | 9/2014 | Henning et al. |
| 8,883,932 B2 | 11/2014 | Brugger et al. |
| 8,916,511 B2 | 12/2014 | Maurer et al. |
| 8,921,437 B2 | 12/2014 | Knott et al. |
| 8,946,369 B2 | 2/2015 | Henning et al. |
| 8,957,009 B2 | 2/2015 | Schubert et al. |
| 8,974,627 B2 | 3/2015 | Schubert et al. |
| 8,993,706 B2 | 3/2015 | Schubert et al. |
| 9,035,011 B2 | 5/2015 | Ferenz et al. |
| 9,051,424 B2 | 6/2015 | Lobert et al. |
| 9,068,044 B2 | 6/2015 | Schubert et al. |
| 9,115,335 B2 | 8/2015 | Trosin et al. |
| 9,175,126 B2 | 11/2015 | Albrecht et al. |
| 9,315,614 B2 | 4/2016 | Schubert et al. |
| 9,328,210 B2 | 5/2016 | Terheiden et al. |
| 9,334,354 B2 | 5/2016 | Ferenz et al. |
| 9,346,919 B2 | 5/2016 | Jazkewitsch et al. |
| 9,353,225 B2 | 5/2016 | Knott et al. |
| 9,440,220 B2 | 9/2016 | Naumann et al. |
| 9,441,145 B2 | 9/2016 | Schubert et al. |
| 9,539,549 B2 | 1/2017 | Haensel et al. |
| 9,540,500 B2 | 1/2017 | Ferenz et al. |
| 9,550,928 B2 | 1/2017 | Lobert et al. |
| 9,657,144 B2 | 5/2017 | Hubel et al. |
| 9,706,771 B2 | 7/2017 | Poffenberger et al. |
| 9,738,797 B2 | 8/2017 | Nilewski et al. |
| 9,783,635 B2 | 10/2017 | Schubert et al. |
| 9,790,327 B2 | 10/2017 | Klotzbach et al. |
| 9,896,534 B2 | 2/2018 | Lobert et al. |
| 9,896,541 B2 | 2/2018 | Fiedel et al. |
| 9,975,909 B2 | 5/2018 | Schubert et al. |
| 9,993,786 B2 | 6/2018 | Roland et al. |
| 10,010,838 B2 | 7/2018 | Favresse et al. |
| 10,087,278 B2 | 10/2018 | Lobert et al. |
| 10,106,644 B2 | 10/2018 | Fiedel et al. |
| 10,106,649 B2 | 10/2018 | Fiedel et al. |
| 10,160,832 B2 | 12/2018 | Lobert et al. |
| 10,189,965 B2 | 1/2019 | Krebs et al. |
| 10,287,448 B2 | 5/2019 | Roland et al. |
| 10,287,454 B2 | 5/2019 | Klotzbach et al. |
| 10,299,471 B2 | 5/2019 | Hänsel et al. |
| 10,351,687 B2 | 7/2019 | Diendorf et al. |
| 10,399,051 B2 | 9/2019 | Favresse et al. |
| 10,407,546 B2 | 9/2019 | Lobert et al. |
| 10,414,872 B2 | 9/2019 | Knott et al. |
| 10,544,384 B2 | 1/2020 | Scheuermann et al. |
| 10,577,512 B2 | 3/2020 | Aitha et al. |
| 10,703,851 B2 | 7/2020 | Günther et al. |
| 10,752,801 B2 | 8/2020 | Favresse et al. |
| 10,787,464 B2 | 9/2020 | Fiedel et al. |
| 10,800,885 B2 | 10/2020 | Fiedel et al. |
| 11,236,204 B2 | 2/2022 | Favresse et al. |
| 11,261,298 B2 | 3/2022 | Favresse et al. |
| 11,279,804 B2 | 3/2022 | Knott et al. |
| 11,332,591 B2 | 5/2022 | Hermann et al. |
| 11,377,523 B2 | 7/2022 | Favresse et al. |
| 2002/0169217 A1 | 11/2002 | Ebbrecht et al. |
| 2004/0198842 A1 | 10/2004 | Bocker et al. |
| 2005/0085563 A1 | 4/2005 | Esselborn et al. |
| 2005/0107523 A1 | 5/2005 | Gippert et al. |
| 2006/0155089 A1 | 7/2006 | Ferenz et al. |
| 2006/0155090 A1 | 7/2006 | Ferenz |
| 2006/0188455 A1 | 8/2006 | Ferenz et al. |
| 2006/0188456 A1 | 8/2006 | Ferenz et al. |
| 2007/0059539 A1 | 3/2007 | Doehler et al. |
| 2007/0100153 A1 | 5/2007 | Brueckner et al. |
| 2007/0184006 A1 | 8/2007 | Ferenz et al. |
| 2007/0197678 A1 | 8/2007 | Cavaleiro et al. |
| 2007/0287765 A1 | 12/2007 | Busch et al. |
| 2008/0027202 A1 | 1/2008 | Ferenz et al. |
| 2008/0064782 A1 | 3/2008 | Doehler et al. |
| 2008/0076842 A1 | 3/2008 | Ferenz et al. |
| 2008/0187702 A1 | 8/2008 | Ferenz et al. |
| 2008/0221276 A1 | 9/2008 | Schwab et al. |
| 2008/0305065 A1 | 12/2008 | Ferenz et al. |
| 2009/0062459 A1 | 3/2009 | Thum et al. |
| 2009/0137751 A1 | 5/2009 | Knott et al. |
| 2009/0137752 A1 | 5/2009 | Knott et al. |
| 2010/0031852 A1 | 2/2010 | Herrwerth et al. |
| 2010/0034765 A1 | 2/2010 | Herrwerth et al. |
| 2010/0036011 A1 | 2/2010 | De Gans et al. |
| 2010/0041910 A1 | 2/2010 | Schubert et al. |
| 2010/0055760 A1 | 3/2010 | Thum et al. |
| 2010/0056649 A1 | 3/2010 | Henning et al. |
| 2010/0056818 A1 | 3/2010 | Ferenz et al. |
| 2010/0071849 A1 | 3/2010 | Knott et al. |
| 2010/0081763 A1 | 4/2010 | Meyer et al. |
| 2010/0081781 A1 | 4/2010 | Schubert et al. |
| 2010/0105843 A1 | 4/2010 | Knott et al. |
| 2010/0113633 A1 | 5/2010 | Henning et al. |
| 2010/0168367 A1 | 7/2010 | Schubert et al. |
| 2010/0184913 A1 | 7/2010 | Ebbrecht et al. |
| 2010/0210445 A1 | 8/2010 | Von Rymon Lipinski et al. |
| 2010/0248325 A1 | 9/2010 | Eckstein et al. |
| 2010/0266518 A1 | 10/2010 | Springer et al. |
| 2010/0266651 A1 | 10/2010 | Czech et al. |
| 2011/0021688 A1 | 1/2011 | Herzig et al. |
| 2011/0021693 A1 | 1/2011 | Henning et al. |
| 2011/0042004 A1 | 2/2011 | Schubert et al. |
| 2011/0046305 A1 | 2/2011 | Schubert et al. |
| 2011/0070175 A1 | 3/2011 | Herrwerth et al. |
| 2011/0091399 A1 | 4/2011 | Meyer et al. |
| 2011/0144269 A1 | 6/2011 | Kuppert et al. |
| 2011/0230619 A1 | 9/2011 | Kuppert et al. |
| 2011/0230633 A1 | 9/2011 | Ferenz et al. |
| 2011/0245412 A1 | 10/2011 | Schubert et al. |
| 2011/0251070 A1 | 10/2011 | Poffenberger et al. |
| 2011/0281973 A1 | 11/2011 | Schubert et al. |
| 2012/0010302 A1 | 1/2012 | Hartung et al. |
| 2012/0027704 A1 | 2/2012 | Henning et al. |
| 2012/0028022 A1 | 2/2012 | Brugger et al. |
| 2012/0029090 A1 | 2/2012 | Brugger et al. |
| 2012/0037036 A1 | 2/2012 | Veit et al. |
| 2012/0046486 A1 | 2/2012 | Henning et al. |
| 2012/0067520 A1 | 3/2012 | Schubert et al. |
| 2012/0068110 A1 | 3/2012 | Schubert et al. |
| 2012/0071564 A1 | 3/2012 | De Gans et al. |
| 2012/0097883 A1 | 4/2012 | Henning et al. |
| 2012/0168664 A1 | 7/2012 | Maurer et al. |
| 2012/0190760 A1 | 7/2012 | Henning et al. |
| 2012/0279922 A1 | 11/2012 | Haensel et al. |
| 2012/0294819 A1 | 11/2012 | Herrwerth et al. |
| 2012/0296125 A1 | 11/2012 | Schubert et al. |
| 2012/0308494 A1 | 12/2012 | Schubert et al. |
| 2013/0035408 A1 | 2/2013 | Knott et al. |

(56) References Cited

U.S. PATENT DOCUMENTS

| | | |
|---|---|---|
| 2013/0035409 A1 | 2/2013 | Hubel et al. |
| 2013/0041102 A1 | 2/2013 | Albrecht et al. |
| 2013/0041115 A1 | 2/2013 | Knott et al. |
| 2013/0172180 A1 | 7/2013 | Naumann et al. |
| 2013/0190414 A1 | 7/2013 | Terheiden et al. |
| 2013/0213267 A1 | 8/2013 | Fiedel et al. |
| 2013/0217907 A1 | 8/2013 | Henning et al. |
| 2013/0217930 A1 | 8/2013 | Haensel et al. |
| 2013/0237616 A1 | 9/2013 | Ferenz et al. |
| 2013/0245304 A1 | 9/2013 | Schubert et al. |
| 2013/0259821 A1 | 10/2013 | Henning et al. |
| 2013/0267403 A1 | 10/2013 | Von Rymon Lipinski et al. |
| 2013/0281552 A1 | 10/2013 | Nilewski et al. |
| 2013/0302874 A1 | 11/2013 | Thum et al. |
| 2013/0331592 A1 | 12/2013 | Hartung et al. |
| 2013/0345318 A1 | 12/2013 | Schubert et al. |
| 2014/0057819 A1 | 2/2014 | Haensel et al. |
| 2014/0179894 A1 | 6/2014 | Lobert et al. |
| 2014/0256844 A1 | 9/2014 | Henning et al. |
| 2014/0274863 A1 | 9/2014 | Trosin et al. |
| 2014/0303065 A1 | 10/2014 | Jazkewitsch et al. |
| 2015/0057369 A1 | 2/2015 | Ferenz et al. |
| 2015/0057412 A1 | 2/2015 | Knott et al. |
| 2015/0093575 A1 | 4/2015 | Naumann et al. |
| 2015/0159068 A1 | 6/2015 | Schubert et al. |
| 2015/0329752 A1 | 11/2015 | Albrecht et al. |
| 2016/0053051 A1 | 2/2016 | Schubert et al. |
| 2016/0053145 A1 | 2/2016 | Lobert et al. |
| 2016/0075846 A1 | 3/2016 | Krebs et al. |
| 2016/0130402 A1 | 5/2016 | Schubert et al. |
| 2016/0160009 A1 | 6/2016 | Ferenz et al. |
| 2016/0160081 A1 | 6/2016 | Klotzbach et al. |
| 2016/0208050 A1 | 7/2016 | Klotzbach et al. |
| 2016/0311963 A1 | 10/2016 | Lobert et al. |
| 2016/0319094 A1 | 11/2016 | Diendorf et al. |
| 2016/0340601 A1 | 11/2016 | Hänsel et al. |
| 2017/0065951 A1 | 3/2017 | Roland et al. |
| 2017/0081464 A1 | 3/2017 | Fiedel et al. |
| 2017/0081469 A1 | 3/2017 | Fiedel et al. |
| 2017/0088667 A1 | 3/2017 | Fiedel et al. |
| 2017/0174817 A1 | 6/2017 | Günther et al. |
| 2017/0226285 A1 | 8/2017 | Lobert et al. |
| 2017/0274335 A1 | 9/2017 | Favresse et al. |
| 2017/0283554 A1 | 10/2017 | Lobert et al. |
| 2018/0010007 A1 | 1/2018 | Roland et al. |
| 2018/0016392 A1 | 1/2018 | Lobert et al. |
| 2018/0016525 A1 | 1/2018 | Scheuermann et al. |
| 2018/0028994 A1 | 2/2018 | Favresse et al. |
| 2018/0094146 A1 | 4/2018 | Aitha et al. |
| 2018/0125067 A1 | 5/2018 | Hänsel et al. |
| 2018/0194682 A1 | 7/2018 | Schubert et al. |
| 2018/0305596 A1 | 10/2018 | Schubert et al. |
| 2018/0355115 A1 | 12/2018 | Knott et al. |
| 2019/0031880 A1 | 1/2019 | Cavaleiro et al. |
| 2019/0040205 A1 | 2/2019 | Knott et al. |
| 2019/0092904 A1 | 3/2019 | Fiedel et al. |
| 2019/0100620 A1 | 4/2019 | Lobert et al. |
| 2019/0106369 A1 | 4/2019 | Schubert et al. |
| 2019/0194488 A1 | 6/2019 | Favresse et al. |
| 2020/0181017 A1 | 6/2020 | Schubert et al. |
| 2020/0216474 A1 | 7/2020 | Fiedel et al. |
| 2020/0377525 A1 | 12/2020 | Knott et al. |
| 2020/0377640 A1 | 12/2020 | Knott et al. |
| 2020/0377663 A1 | 12/2020 | Favresse et al. |
| 2020/0377667 A1 | 12/2020 | Favresse et al. |
| 2020/0377668 A1 | 12/2020 | Favresse et al. |
| 2020/0377669 A1 | 12/2020 | Knott et al. |
| 2020/0377684 A1 | 12/2020 | Hermann et al. |
| 2021/0047474 A1 | 2/2021 | Klostermann et al. |
| 2021/0145010 A1 | 5/2021 | Hänsel et al. |
| 2021/0163751 A1 | 6/2021 | Cavaleiro et al. |
| 2022/0017679 A1 | 1/2022 | Glos et al. |
| 2022/0033587 A1 | 2/2022 | Knott et al. |
| 2022/0041829 A1 | 2/2022 | Glos et al. |

FOREIGN PATENT DOCUMENTS

| | | |
|---|---|---|
| DE | 10 2004 018 926 | 11/2005 |
| EP | 0658361 | 4/1997 |
| EP | 1 464 371 | 10/2004 |
| EP | 1 533 333 | 5/2005 |
| EP | 1 634 940 | 3/2006 |
| EP | 1 892 327 | 2/2008 |
| EP | 2182020 | 5/2010 |
| EP | 2 289 977 | 3/2011 |
| EP | 2 703 476 | 3/2014 |
| EP | 2 998 333 | 3/2016 |
| EP | 3 219 738 | 9/2017 |
| EP | 3 415 548 | 12/2018 |
| EP | 3 572 470 | 11/2019 |
| WO | 2008/074564 | 6/2008 |
| WO | 2010/046181 | 4/2010 |
| WO | 2012/130674 | 10/2012 |
| WO | 2013/017365 | 2/2013 |
| WO | 2013/156237 | 10/2013 |
| WO | 2016/020201 | 2/2016 |
| WO | 2019/162360 | 8/2019 |
| WO | 2020/114762 | 6/2020 |
| WO | 2020/144003 | 7/2020 |
| WO | 2020/144004 | 7/2020 |

OTHER PUBLICATIONS

U.S. Appl. No. 11/327,234, filed Jan. 6, 2006, 2006/0155090, Michael Ferenz.
U.S. Appl. No. 11/530,562, filed Sep. 11, 2006, 2007/0059539, Doehler et al.
U.S. Appl. No. 11/677,244, filed Feb. 21, 2007, 2007/0197678, Cavaleiro et al.
U.S. Appl. No. 12/277,852, filed Nov. 25, 2008, 2009/0137752, Knott et al.
U.S. Appl. No. 12/024,305, filed Feb. 1, 2008, 2008/0187702, Ferenz et al.
U.S. Appl. No. 12/364,283, filed Feb. 2, 2009, 2010/0036011, De Gans et al.
U.S. Appl. No. 12/370,733, filed Feb. 13, 2009, 2010/0210445, Von Rymon Lipinski et al.
U.S. Appl. No. 13/855,273, filed Apr. 2, 2013, 2013/0267403, Von Rymon Lipinski et al.
U.S. Appl. No. 12/414,805, filed Mar. 31, 2009, 2010/0081781, Schubert et al.
U.S. Appl. No. 13/058,372, filed Feb. 10, 2011, 2011/0144269, Kuppert et al.
U.S. Appl. No. 12/536,146, filed Aug. 5, 2009, 2010/0034765, Herrwerth et al.
U.S. Appl. No. 13/650,221, filed Oct. 12, 2012, 2013/0041115, Knott et al.
U.S. Appl. No. 12/750,813, filed Mar. 31, 2010, 2010/0248325, Eckstein et al.
U.S. Appl. No. 12/759,787, filed Apr. 14, 2010, 2010/0266518, Springer et al.
U.S. Appl. No. 13/322,477, filed Nov. 25, 2011, 2012/0068110, Schubert et al.
U.S. Appl. No. 14/282,608, filed May 20, 2014, 2014/0256844, Henning et al.
U.S. Appl. No. 13/031,324, filed Feb. 21, 2011, 2011/0230619, Kuppert et al.
U.S. Appl. No. 13/358,142, filed Jan. 25, 2012, 2012/0190760, Henning et al.
U.S. Appl. No. 14/813,893, filed Jul. 30, 2015, 2015/0329752, Albrecht et al.
U.S. Appl. No. 13/195,049, filed Aug. 1, 2011, 2012/0028022, Brugger et al.
U.S. Appl. No. 13/205,834, filed Aug. 9, 2011, 2012/0037036, Veit et al.
U.S. Appl. No. 13/992,311, filed Jun. 7, 2013, 2013/0259821, Henning et al.
U.S. Appl. No. 14/001,382, filed Aug. 23, 2013, 2013/0331592, Hartung et al.

(56) References Cited

OTHER PUBLICATIONS

U.S. Appl. No. 13/771,921, filed Feb. 20, 2013, 2013/0213267, Fiedel et al.
U.S. Appl. No. 13/923,896, filed Jun. 21, 2013, 2013/0345318, Schubert et al.
U.S. Appl. No. 13/771,973, filed Feb. 20, 2013, 2013/0217930, Haensel et al.
U.S. Appl. No. 14/896,781, filed Dec. 8, 2015, 2016/0130402, Schubert et al.
U.S. Appl. No. 15/114,638, filed Jul. 27, 2016, 2016/0340601, Hänsel et al.
U.S. Appl. No. 15/540,605, filed Jun. 29, 2017, 2018/0016392, Lobert et al.
U.S. Appl. No. 15/741,524, filed Jan. 3, 2018, 2018/0194682, Schubert et al.
U.S. Appl. No. 16/788,389, filed Feb. 12, 2020, 2020/0181017, Schubert et al.
U.S. Appl. No. 15/767,894, filed Apr. 12, 2018, 2018/0305596, Schubert et al.
U.S. Appl. No. 16/087,762, filed Sep. 24, 2018, 2019/0106369, Schubert et al.
U.S. Appl. No. 16/044,960, filed Jul. 25, 2018, 2019/0031880, Cavaleiro et al.
U.S. Appl. No. 17/158,498, filed Jan. 26, 2021, 2021/0163751, Cavaleiro et al.
U.S. Appl. No. 15/733,753, filed Oct. 16, 2020, 2021/0145010, Hänsel et al.
U.S. Appl. No. 16/966,914, filed Aug. 3, 2020, 2021/0047474, Klostermann et al.
U.S. Appl. No. 15/929,836, filed May 26, 2020, 2020/0377640, Knott et al.
U.S. Appl. No. 16/849,106, filed Apr. 15, 2020, 2020/0377525, Knott et al.

\* cited by examiner

DEFOAMER COMPOSITION BASED ON ORGANOFUNCTIONALLY MODIFIED POLYSILOXANES

CROSS-REFERENCE TO RELATED APPLICATIONS

This application claims priority to European Patent Application No. 20191077.5, filed Aug. 14, 2020, the content of which is hereby incorporated by reference in its entirety.

BACKGROUND OF THE INVENTION

Field of the Invention

The present invention relates to a defoamer composition based on organofunctionally modified polysiloxanes.

Description of Related Art

Foam is an often occurring undesired phenomenon in the production and processing of paints, coatings and printing inks. Thus the formation of foam can have the result that the production vessels cannot be optimally filled. It accordingly disrupts production operations and results in unnecessary waiting times. In printing operations for example foam results in overflowing of the ink troughs and impairs ink transfer from the roller to the substrate. Dried foam leaves surface defects behind in the coating film. The cause of foam is the introduction of gas into the liquid material. This occurs for example through:
- mechanical introduction of air during production through stirring and mixing,
- displacement of air during wetting of pigments and fillers, mechanical introduction of air during application through rolling, spraying, printing for example,
- displacement of air during coating of porous substrates.

Practically all components in the coating recipe can have a positive or negative effect on foaming behaviour. Defoamers must therefore be added to the formulations in order to avoid foam and eliminate foam that has already formed.

Typical active ingredients for the formulation of defoamers are polysiloxanes, mineral and vegetable oils or polymers. It is known that combination of the active ingredients with one another but also addition of finely divided hydrophobic solids, for example silicas, make it possible to formulate particularly effective defoamers tailored to specific applications.

Silicones have been used in the paint industry since the beginning of the 1950s. The most important silicone properties, such as compatibility, slip resistance or scratch resistance for instance, were able to be controlled especially through chemical modification of the dimethylpolysiloxane chain.

Known modified dimethylpolysiloxane chains are polyoxyalkylene-polysiloxanes, wherein the balanced ratio of the polyoxyalkylene blocks thereof and the polysiloxane blocks thereof and also the construction of the two blocks are of great importance. There are a multiplicity of variables both for the polyoxyalkylene block and for the polysiloxane block for construction of the most effective possible defoamer for use in wood, plastic, industrial and automotive coatings or printing inks.

The polyoxyalkylene block may be composed of various oxyalkylene units, especially of oxyethylene, oxypropylene and oxybutylene units. The weight ratio of these units to one another, the sequence thereof and the molar weight of the polyoxyalkylene block may be varied. Also of importance is the end group of the polyoxyalkylene block which may be reactive (for example OH group) or inert (for example alkoxy group). The polyoxyalkylene block may be bonded to the polysiloxane block by a hydrolytically stable C—Si bond or the hydrolytically less stable C—O—Si bond. Different polyoxyalkylene blocks may also be bonded to the polysiloxane block. The polysiloxane block may be varied in respect of the nature and proportion of the Si units. The siloxane block may be linear or branched and have different molecular weights. The polyoxyalkylene blocks may be terminally and/or laterally bonded to the polysiloxane block. Predictions about the effectiveness of a polysiloxane-polyoxyalkylene block copolymer as a defoamer are possible only to a limited extent. Those skilled in the art are therefore compelled to investigate possible variations largely by empirical means. Given the large, virtually inestimable number of possible variations, finding specific structural parameters and corresponding polyoxyalkylene-polysiloxanes that are particularly effective in the context of production of defoamers is an achievement which progresses the art and is therefore inventive.

Polyoxyalkylene-polysiloxanes used in coatings technology have been described many times in the prior art. From the large number of corresponding publications the following documents are cited as representative examples.

EP 0 427 263 for example describes a silicone-based defoamer preparation which comprises a polydiorganosiloxane, silica and a modified silicone oil.

EP 0 785 240 B1 also discloses aqueous and radiation-curing printing coatings and printing inks comprising specific polyoxyalkylene-polysiloxane copolymers having improved scratch resistance, elevated surface slip and also an exceptionally low foaming propensity, so that printing ink production proceeds more smoothly while at the same time achieving an optically appealing printed image.

EP 0 658 361 discloses a defoamer emulsion based on organofunctionally modified polysiloxanes which is obtainable by mixing one or more particularly defined organofunctionally modified siloxanes and finely divided silicas and emulsifying the mixture with water comprising a hydrophilic organofunctionally modified polysiloxane using a low-shear stirrer.

The use of organofunctionally modified polysiloxanes for defoaming of liquids is therefore known in the art. There is a multiplicity of publications and patent specifications describing the mode of action of siloxanes and providing indications for the choice of suitable siloxanes and their preparation forms. It was already recognized early on that the use of mixtures of different polysiloxanes may be advantageous. To this end a large number of polysiloxanes organofunctionally modified in different ways has also been developed.

An essential feature of all defoamers is their targeted and controlled incompatibility with the medium to be defoamed. A defoamer with too high a compatibility does not specifically migrate into the foam lamella to achieve destabilization thereof but rather is present in the entire coating film; the defoaming activity is then only slight if present at all. Excessive incompatibility leads to coating film defects such as cloudiness or craters becoming disruptively apparent. The choice of suitable defoamer is thus a kind of "balancing act" between compatibility and incompatibility. This means that either a little of the defoamer activity is sacrificed to make the defoamer more compatible with the coating system or coating film defects are accepted in order to have no waiting times during production for example. This compromise appears inevitable.

SUMMARY OF THE INVENTION

The problem addressed by the present invention is accordingly that of providing a defoamer composition which overturns this rule of effectiveness and compatibility.

In order to solve the problem the inventors accordingly propose a defoamer composition based on organofunctionally modified polysiloxanes comprising
- one or more laterally polyether-modified polysiloxanes as component A and
- at least one terminally polyether-modified polysiloxane as component B.

The invention also includes the following embodiments:
1. Defoamer composition based on organofunctionally modified polysiloxanes comprising
   - one or more laterally polyether-modified polysiloxanes as component A and
   - at least one terminally polyether-modified polysiloxane as component B.
2. Composition according to embodiment 1, characterized in that the organofunctionally modified polysiloxanes are linear organofunctionally modified polysiloxanes.
3. Composition according to either of the preceding embodiments, characterized in that component A conforms to general formula (I)

$$\text{R}-\underset{\underset{R}{|}}{\overset{\overset{R}{|}}{\text{Si}}}-\text{O}-\left[\underset{\underset{R}{|}}{\overset{\overset{R^1}{|}}{\text{SiO}}}\right]_n-\left[\underset{\underset{R}{|}}{\overset{\overset{R}{|}}{\text{SiO}}}\right]_m-\underset{\underset{R}{|}}{\overset{\overset{R}{|}}{\text{Si}}}-\text{R} \quad \text{(I)}$$

where
- R=identical and/or different alkyl radicals having 1 to 8 carbon atoms, preferably having 1-4 carbon atoms, particularly preferably having 1 or 2 carbon atoms,
- $R^1=\text{---}C_pH_{2p}O[(C_2H_4O)_x(C_3H_6O)_y]R^2$, wherein p=2, 3 or 4, $R^2$=hydrogen and/or an alkyl radical having 1 to 3 carbon atoms,
- m=10-400, preferably 20-300, particularly preferably 30-200,
- n=1 to 15, preferably 2 to 8,
- wherein x and y are selected such that the molar weight of the polyoxyalkylene block $\text{---}C_pH_{2p}O[(C_2H_4O)_x(C_3H_8O)_y]\text{---}$ is in the range of 500-10000 g/mol, preferably 1000-8000 g/mol and particularly preferably 2000 g/mol-6000 g/mol.
4. Composition according to any of the preceding embodiments, characterized in that component B conforms to general formula (II)

$$\text{R}^4-\underset{\underset{CH_3}{|}}{\overset{\overset{CH_3}{|}}{\text{Si}}}-\text{O}-\left[\underset{\underset{CH_3}{|}}{\overset{\overset{R^3}{|}}{\text{SiO}}}\right]_f-\left[\underset{\underset{R^4}{|}}{\overset{\overset{CH_3}{|}}{\text{SiO}}}\right]_g-\underset{\underset{CH_3}{|}}{\overset{\overset{CH_3}{|}}{\text{Si}}}-\text{R}^4 \quad \text{(II)}$$

where
- $R^3$=identical and/or different alkyl radicals having 1 to 8 carbon atoms, preferably having 1-4 carbon atoms, particularly preferably having 1 or 2 carbon atoms,
- $R^4=R^3$ and/or $\text{---}C_pH_{2p}O[(C_2H_4O)_x(C_3H_6O)_y]R^2$ and/or $\text{---}C_pH_{2p}O[(C_3H_6O)_y]R^2$, wherein p=2, 3 or 4, with the proviso that at least one $R^4=\text{---}C_pH_{2p}O[(C_9H_4O)_x(C_3H_6O)_y]\text{---}$ or $\text{---}C_pH_{2p}O(C_3H_6O)_y]\text{---}$ is terminal,
- $R^2$=alkyl radical having 1 to 3 carbon atoms and/or hydrogen, preferably an alkyl radical having 1 to 3 carbon atoms,
- f=20-500, preferably 25-200, particularly preferably 35-100,
- g=1 to 15, preferably 2 to 8,
- wherein x and y are selected such that the molar weight of the polyoxyalkylene block $\text{---}C_pH_{2p}O[(C_2H_4O)_x(C_3H_6O)_y]\text{---}$ and/or $\text{---}C_pH_{2p}O(C_3H_5O)_y]\text{---}$ is in the range of 200-4000 g/mol, preferably 500-3000 g/mol and particularly preferably 750-2000 g/mol.
5. Composition according to any of the preceding embodiments, characterized in that y>x in the polyoxyalkylene block $\text{---}C_pH_{2p}O[(C_2H_4O)_x(C_3H_6O)_y]\text{---}$, wherein x and y are natural numbers.
6. Composition according to any of the preceding embodiments, characterized in that polyoxyalkylene block $\text{---}C_pH_{2p}O[(C_2H_4O)_x(C_3H_6O)_y]\text{---}$ in component A has a blockwise construction.
7. Composition according to any of the preceding embodiments, characterized in that $R^4=\text{---}C_pH_{2p}O[(C_2H_4O)_x(C_3H_6O)_y]R^2$ and/or $\text{---}C_pH_{2p}O(C_3H_6O)_y]R^2$, wherein p=2, 3 or 4, with the proviso that at least one $R^4=\text{---}C_pH_{2p}O[(C_2H_4O)_x(C_3H_6O)_y]\text{---}$ or $\text{---}C_pH_{2p}O(C_3H_6O)_y]\text{---}$ is terminal.
8. Composition according to any of the preceding embodiments, characterized in that the molar ratio of siloxane fraction to polyoxyalkylene fraction of component A is smaller than the molar ratio of siloxane fraction to polyoxyalkylene fraction of component B.
9. Composition according to any of the preceding embodiments, characterized in that component A has a molar ratio of siloxane fraction to polyoxyalkylene fraction of 0.15 to 0.35.
10. Composition according to any of the preceding embodiments, characterized in that component A has a viscosity in the range of 2500-60 000 mPas, preferably of 3000 to 55 000 mPas and particularly preferably of 4000 to 50 000 mPas measured according to DIN 53015.
11. Composition according to any of the preceding embodiments, characterized in that component B has a molar ratio of siloxane fraction to polyoxyalkylene fraction of 0.4 to 2.
12. Composition according to any of the preceding embodiments, characterized in that component B has a viscosity in the range of 250-1200 mPas, preferably of 300 to 1000 mPas and particularly preferably of 350 to 900 mPas measured according to DIN 53015,
13. Composition according to any of the preceding embodiments, characterized in that component A has a higher compatibility measured by a method as described in the description than component B.
14. Composition according to any of the preceding embodiments, characterized in that component B has a higher defoamer activity measured by a method as described in the description than component A.

15. Composition according to any of the preceding embodiments obtainable by stirring components A and B, preferably using a low-shear stirrer.
16. Composition according to any of the preceding embodiments consisting of
    (a) 20% to 80% by weight, preferably 30-70% by weight, particularly preferably 40-60% by weight, of organofunctionally modified polysiloxanes of formula (I) as component A,
    (b) 20% to 80% by weight, preferably 30-70% by weight, particularly preferably 40-60% by weight, of organofunctionally modified polysiloxanes of formula (II) with the proviso that at least one polyoxyalkylene block —$C_pH_{2p}O[(C_2H_4O)_x(C_3H_6O)_y]$— is terminal as component B and
    (c) 0% to 70% by weight, preferably 0-60% by weight, particularly preferably 0-50% by weight, of organofunctionally modified polysiloxanes of formula (II) with the proviso that at least one polyoxyalkylene block —$C_pH_{2p}O(C_3H_6O)_y]$— is terminal as component B', wherein the reported amounts of components A, B and B' sum to 100% by weight and are based on the composition.
17. Composition according to embodiment 10 obtainable by stirring component A into a mixture of components B and B', preferably using a low-shear stirrer.
18. Composition according to any of the preceding embodiments, characterized in that it has a viscosity of 250 to 5000 mPas, preferably 300 to 50 000 mPas, particularly preferably of 350 to 40 000 mPas, measured according to DIN 53015.
19. Composition according to any of the preceding embodiments, characterized in that it has a static surface tension of 20 to 65 mN/m, preferably 25 to 60 nN/m, particularly preferably 30 to 50 mN/m, measured with a Krüss K100 measuring instrument for static surface tension on the basis of DIN EN 14370:2004, and a dynamic surface tension of 20 to 65 mN/m, preferably 25 to 60 nN/m, particularly preferably 30 to 50 mN/m, measured with a Krüss BP 50 bubble pressure tensiometer on the basis of DIN EN 14370:2004.
20. Use of the composition according to any of the preceding embodiments as a defoamer additive, as a flow control additive and/or as a substrate wetting additive.
21. Use of the composition according to any of the preceding embodiments for producing dispersions, millbases, paints, coatings or printing inks, inkjet, grind resins, pigment concentrates, colour preparations, pigment preparations, filler preparations or coating compositions.
22. Use of component A conforming to general formula (I) according to any of the preceding embodiments 1-19 and of component B conforming to general formula (II) according to any of the preceding embodiments 1-19 for producing a defoamer composition.

DETAILED DESCRIPTION OF THE INVENTION

In the context of the present invention the terms medium, coating system, coating or paint formulation, coating recipe and coating composition are to be understood as being synonymous. They are systems to be defoamed.

The terms polyether-modified polysiloxane and polyether polysiloxane are to be understood as being synonymous.

It has surprisingly been found that combinations of certain topologically distinct polyether-modified polysiloxanes result in synergistically improved properties in terms of defoaming and compatibility in media to be defoamed. These synergy effects were surprising.

A person skilled in the art is aware that combining for example a first polyether polysiloxane having high compatibility and low defoamer activity with a second polyether polysiloxane having low compatibility and high defoamer activity affords a composition whose compatibility is lower than that of the first polyether polysiloxane and whose defoamer activity is lower than that of the second polyether polysiloxane.

Investigations have shown that this reduction is based on a rule. Comparative Example 2 with FIGS. 2A and 2B demonstrate this rule. According to this rule the values for compatibility and defoamer activity of the mixture lie between the respective values of the individual polyether polysiloxanes. They lie virtually on a straight line.

Figure 3A:
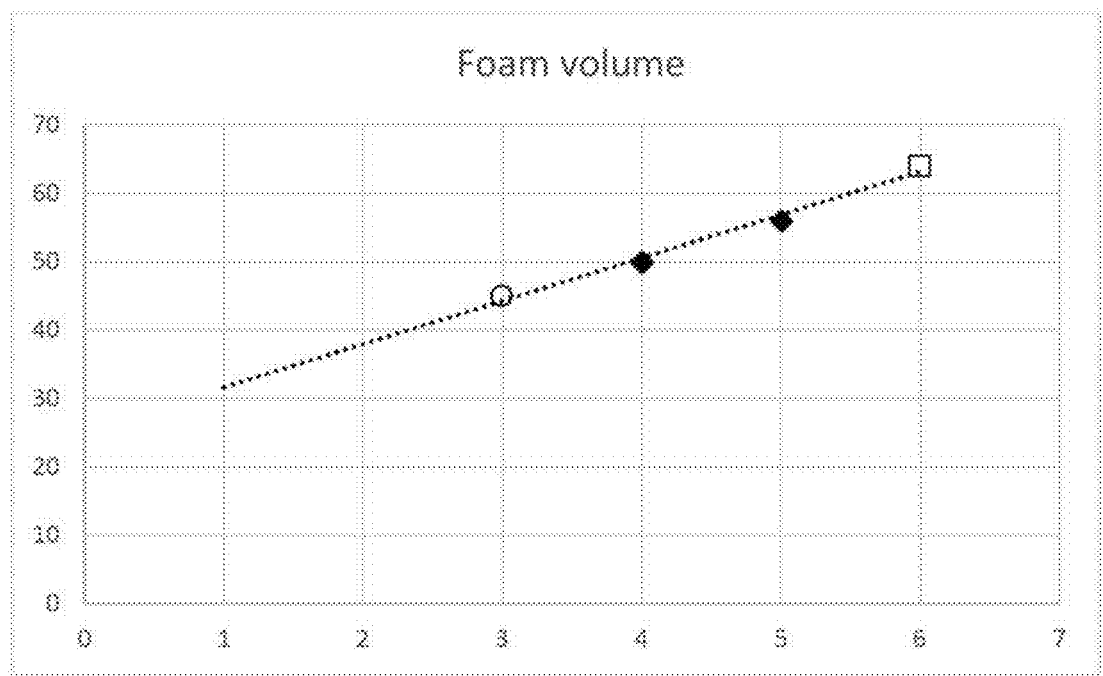
FIG. 3A shows a graph of the foam volume of TEGO Foamex 830, TEGO Foamex 844, and two mixtures thereof.
Figure 3B:
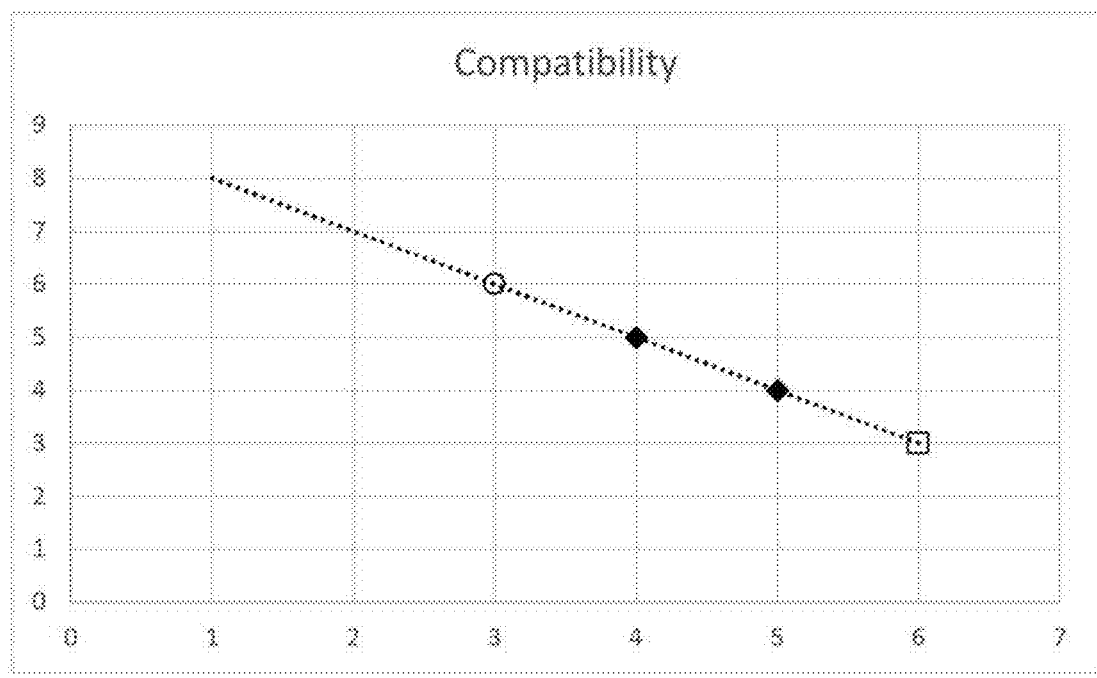
FIG. 3B shows a graph of the compatibility of TEGO Foamex 830, TEGO Foamex 844, and two mixtures thereof.

Comparative Example 3 with FIGS. 3A and 3B also demonstrate this linear relationship (dashed line). A polyether was employed as the compatible component here.

Figure 1A:
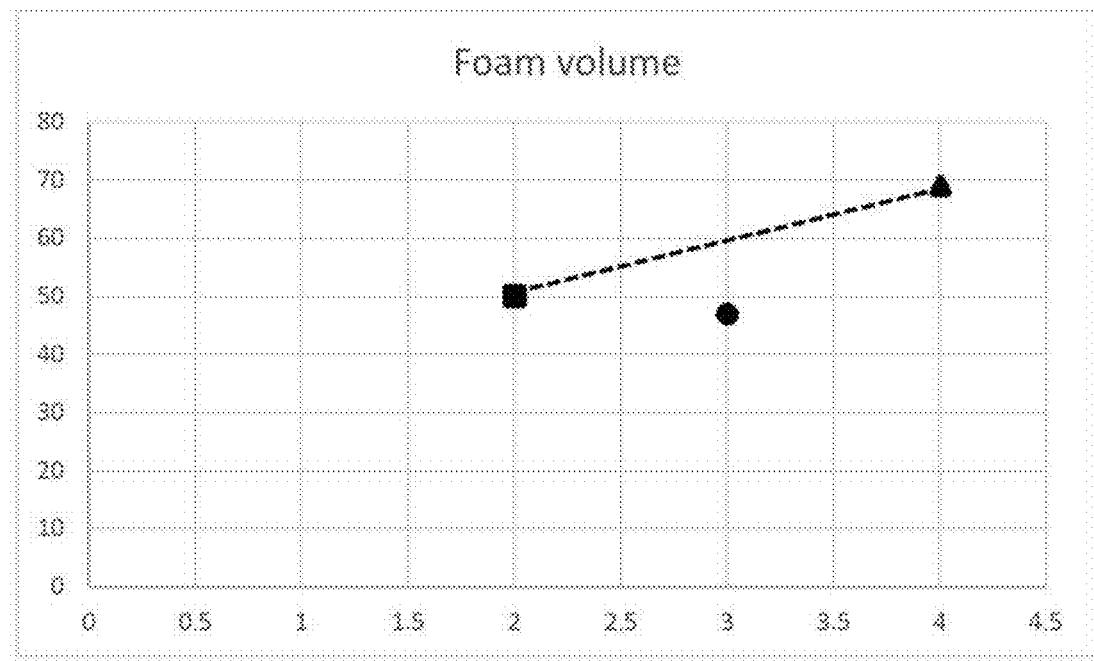
FIG. 1A shows a graph of the foam volume of the inventive composition, component A, and component B.
Figure 1B:
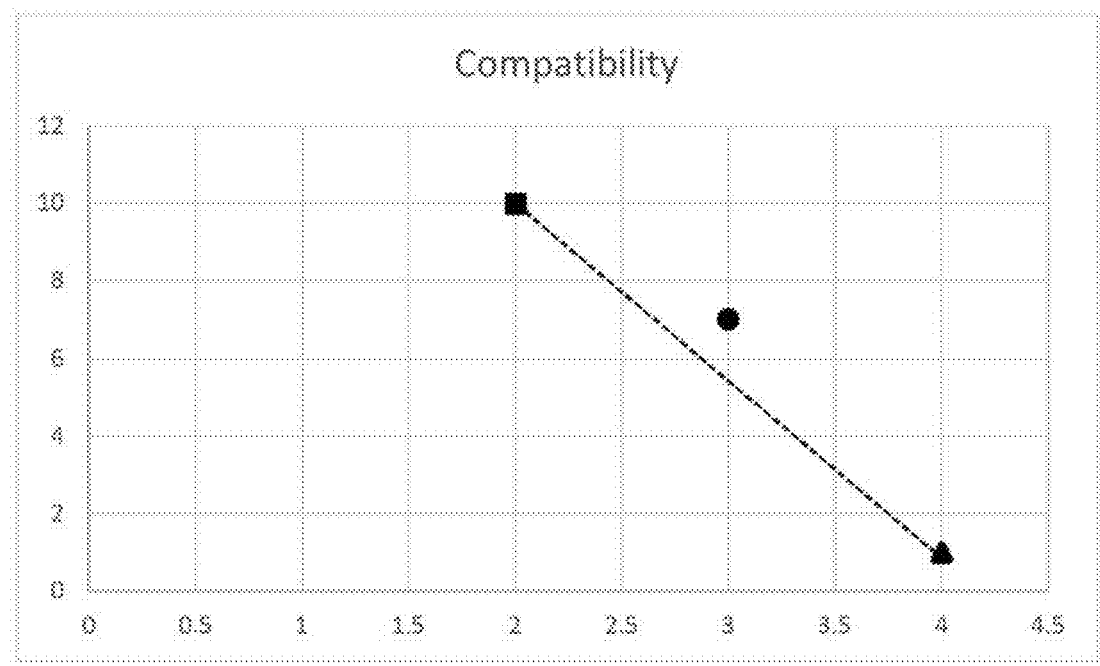
FIG. 1B shows a graph of the compatibility of the inventive composition, component A, and component B.

The inventive defoamer composition comprising the specifically selected topological polyether-modified polysiloxanes exhibits in FIGS. 1A and 1B synergy effects that do not conform to this rule. The values lie outside the dashed line that a person skilled in the art would have expected. Furthermore, the defoamer composition according to the invention exhibits a better defoamer activity than the individual components.

The term "defoaming" is often used to describe the removal of gas bubbles from the coating. However, in certain cases a distinction should be made between "defoaming" and "deaerating". The gas bubbles must first reach the surface. The removal of the foam bubbles which then takes place at the surface is referred to as defoaming. Defoamers are only active at the surface where they remove air bubbles present there. By contrast, deaerators must be active in the entire coating film. Foam on the surface. Defoamers destabilize the foam bubbles. Air inclusions in the coating film. Deaerators accelerate migration of the bubbles to the surface.

The defoamer composition according to the invention is suitable for defoaming and deaerating. Hereinbelow the term "defoamer" is used for both effects although in certain cases the term "deaerator" would actually be more correct.

It is preferable when the organofunctionally modified polysiloxanes are linear organofunctionally modified polysiloxanes.

Component A is preferably a compound of general formula (I)

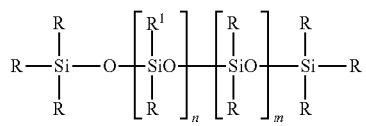

where
R=identical and/or different alkyl radicals having 1 to 8 carbon atoms, preferably having 1-4 carbon atoms, particularly preferably having 1 or 2 carbon atoms,
$R^1 = -C_pH_{2p}O[(C_2H_4O)_x(C_3H_6O)_y]R^2$, wherein p=2, 3 or 4, $R^2$=hydrogen and/or an alkyl radical having 1 to 3 carbon atoms,
m=10-400, preferably 20-300, particularly preferably 30-200,
n=1 to 15, preferably 2 to 8,
wherein x and y are selected such that the molar weight of the polyoxyalkylene block $-C_pH_{2p}O[(C_2H_4O)_x(C_3H_6O)_y]-$ is in the range of 500-10 000 g/mol, preferably 1000-8000 g/mol and particularly preferably 2000 g/mol-6000 g/mol.

It is preferably conceivable that $R^2$ may be hydrogen or an acetate group.

It is also preferably possible for $R^1$ to comprise this radical $-C_pH_{2p}O(C_3H_6O)_yR^2$.

Component B is preferably a compound according to general formula (II)

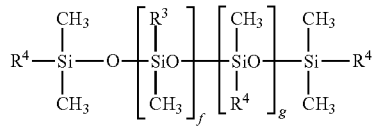

where
$R^3$=identical and/or different alkyl radicals having 1 to 8 carbon atoms, preferably having 1-4 carbon atoms, particularly preferably having 1 or 2 carbon atoms,
$R^4 = R^3$ and/or $-C_pH_{2p}O[(C_2H_4O)_x(C_3H_6O)_y]R^2$ and/or $-C_pH_{2p}O(C_3H_6O)_yR^2$, wherein p=2, 3 or 4, with the proviso that at least one $R^4 = -C_pH_{2p}O[(C_2H_4O)_x(C_3H_6O)_y]-$ or $-C_pH_{2p}O(C_3H_6O)_y]-$ is terminal,
$R^2$=alkyl radical having 1 to 3 carbon atoms and/or hydrogen, preferably an alkyl radical having 1 to 3 carbon atoms,
f=20-500, preferably 25-200, particularly preferably 35-100,
g=1 to 15, preferably 2 to 8,
wherein x and y are selected such that the molar weight of the polyoxyalkylene block $-C_pH_{2p}O[(C_2H_4O)_x(C_3H_6O)_y]-$ and/or $-C_pH_{2p}O(C_3H_6O)_y]-$ is in the range of 200-4000 g/mol, preferably 500-3000 g/mol and particularly preferably 750-2000 g/mol.

Preferably with the proviso that y>x in the polyoxyalkylene block $-C_pH_{2p}O[(C_2H_4O)_x(C_3H_6O)_y]-$, wherein x and y are natural numbers.

It is obvious to a person skilled in the art that the obtained compounds according to formula (I) and formula (II) are in the form of a mixture whose distribution is substantially determined by statistical rules. The values for x, y, f, g, p and also n and m therefore correspond to average values.

The values of the indices n and m/f and g are of substantial importance to the properties of the polyoxyalkylene-polysiloxanes. n/f indicates the number of methylalkylsiloxy units and determines the chain length of the siloxane fraction. It is a familiar concept to a person skilled in the art that the compounds are in the form of a mixture having a distribution controlled substantially by statistical rules. The value of n/f therefore represents the average number of methylalkylsiloxy units.

The polysiloxanes employed according to the invention are generally produced by a metal-catalyzed, preferably platinum-catalyzed, addition reaction of a polysiloxane comprising silane hydrogen(s) with a linear polyoxyalkylene oxide polyether whose linear chain is functionalized at one end with an alkyleneoxy group (such as allyloxy or vinyloxy) and at the other end is for example OH functional or capped with an alkoxy, aralkyloxy or acyloxy group as per the following equation:

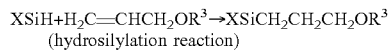
(hydrosilylation reaction)

The polysiloxanes according to the invention are known in principle. Further production processes are disclosed in EP 0 785 240 B1.

According to the invention the polyoxyalkylene blocks preferably consist of oxyethylene and oxypropylene units, preferably deriving from ethylene oxides and propylene oxides.

The polyoxyalkylene blocks may conceivably consist of oxyphenylethylene or oxybutylene units.

The polyoxyalkylene block $-C_pH_{2p}O[(C_2H_4O)_x(C_3H_6O)_y]-$ in component A preferably has a blockwise construction.

The polyoxyalkylene block in component A particularly preferably consists of three blocks, the middle block of pure oxypropylene units and the remaining blocks of oxyethylene and oxypropylene mixtures.

It is preferable when $R^4 = -C_pH_{2p}O[(C_2H_4O)_x(C_3H_6O)_y]R^2$ and/or $-C_pH_{2p}O(C_3H_6O)_yR^2$, wherein p=2, 3 or 4, with the proviso that at least one $R^4 = -C_pH_{2p}O[(C_2H_4O)_x(C_3H_6O)_y]-$ or $-C_pH_{2p}O(C_3H_6O)_y]-$ is terminal.

Component B preferably comprises laterally and terminally modified polyoxyalkylene-polysiloxanes.

The units for component B referred to as x and y may be present in the chain either as a statistical mixture or else blockwise; Statistical distributions may have a blockwise structure with any number of blocks and any sequence or they may be subject to a randomized distribution; they may also have an alternating structure or else form a gradient along the chain; in particular, they can also form any mixed forms in which groups of different distributions may optionally follow one another. Specific embodiments may result in statistical distributions being restricted as a consequence of the embodiment. For all regions unaffected by such restriction, the statistical distribution is unchanged.

The molar ratio of siloxane fraction to polyoxyalkylene fraction of component A is preferably smaller than the molar ratio of siloxane fraction to polyoxyalkylene fraction of component B.

The siloxane fraction in the context of the present invention is defined by the formula (I) without $R^1$/formula (II) without $R^4$.

It is particularly preferable when component A has a molar ratio of siloxane fraction to polyoxyalkylene fraction of 0.15 to 0.35.

It is preferable when component A has a viscosity in the range of 2500-60 000 mPas, preferably of 3000 to 55 000 mPas and particularly preferably of 4000 to 50 000 mPas measured according to DIN 53015.

It is particularly preferable when component B has a molar ratio of siloxane fraction to polyoxyalkylene fraction of 0.4 to 2.

It is preferable when component B has a viscosity in the range of 250-1200 mPas, preferably of 300 to 1000 mPas and particularly preferably of 350 to 900 mPas measured according to DIN 53015.

It is preferable when component A has a higher compatibility measured by a method as described hereinbelow than component B.

It is preferable when component B has a higher defoamer activity measured by a method as described hereinbelow than component A.

The composition according to the invention is preferably obtained by stirring in components A and B, preferably using a low-shear stirrer.

It is possible to add further additives to the composition according to the invention, for instance polyethers, oils of natural and synthetic origin, organic polymers, organomodified silicone polymers and solids. An example of such a suitable finely divided solid is high-dispersity pyrogenic or wet-chemistry derived silica which is commercially available as Aerosil or Sipernat and may be hydrophobized by treatment with organosilicon compounds. Further suitable solids are metal soaps such as magnesium, aluminium and calcium soaps and also polyethylene and amide waxes or ureas.

The composition preferably consists of
(a) 20% to 80% by weight, preferably 30-70% by weight, particularly preferably 40-60% by weight, of organofunctionally modified polysiloxanes of formula (I) as component A,
(b) 20% to 80% by weight, preferably 30-70% by weight, particularly preferably 40-60% by weight, of organofunctionally modified polysiloxanes of formula (II) with the proviso that at least one polyoxyalkylene block $—C_pH_{2p}O[(C_2H_4O)_x(C_3H_6O)_y]—$ is terminal as component B and
(c) 0% to 70% by weight, preferably 0-60% by weight, particularly preferably 0-50% by weight, of organofunctionally modified polysiloxanes of formula (II) with the proviso that at least one polyoxyalkylene block $—C_pH_{2p}O(C_3H_8O)_y]—$ is terminal as component B',
wherein the reported amounts of components A, B and B' sum to 100% by weight and are based on the composition.

The composition according to the invention is preferably obtainable by stirring component A into a mixture of components B and B', preferably using a low-shear stirrer.

It is likewise conceivable that further solids, for example silica, waxes and solids may be added to further increase the defoaming activity. Such additives are known to those skilled in the art.

The composition preferably consists of
(a) 20% to 80% by weight, preferably 30-70% by weight, particularly preferably 40-60% by weight, of organofunctionally modified polysiloxanes of formula (I) as component A,
(b) 20% to 80% by weight, preferably 30-70% by weight, particularly preferably 40-60% by weight, of organofunctionally modified polysiloxanes of formula (II) with the proviso that at least one polyoxyalkylene block $—C_pH_{2p}O[(C_2H_4O)_x(C_3H_6O)_y]—$ is terminal as component B and
(c) 0% to 70% by weight, preferably 0-60% by weight, particularly preferably 0-50% by weight, of organofunctionally modified polysiloxanes of formula (II) with the proviso that at least one polyoxyalkylene block $—C_pH_{2p}O(C_3H_6O)_y]—$ is terminal as component B',
(d) >0% to 5% by weight, preferably 0.1-4.5% by weight, particularly preferably 0:5-3.5% by weight, of a solid selected from silica, urea or waxes,
wherein the reported amounts of components A, B, B' and solids sum to 100% by weight and are based on the composition.

The addition of emulsifiers for producing a defoamer emulsion starting from the composition according to the invention is also possible. Commercially available emulsifiers may be employed here, preferably nonionic emulsifiers selected from fatty alcohol ethoxylates.

It is preferable when the composition has a viscosity of 250 to 5000 mPas, preferably 300 to 50 000, particularly preferably of 350 to 40 000, measured according to DIN 53015:

It is preferable when the composition has a static surface tension of 20 to 65 mN/m, preferably 25 to 60 nN/m, particularly preferably 30 to 50 mN/m, measured with a Krüss K100 measuring instrument for static surface tension on the basis of DIN EN 14370:2004, and a dynamic surface tension of 20 to 65 mN/m, preferably 25 to 60 nN/m, particularly preferably 30 to 50 mN/m, measured with a Krüss BP 50 bubble pressure tensiometer on the basis of DIN EN 14370:2004.

The composition according to the invention preferably has at least a bimodal distribution of the polyethers in a GPC spectrum.

It is preferable when the composition according to the invention has a weight ratio of component A to component B of 9:1 to 1:9, preferably of 4:1 to 1:4 and particularly preferably of 2:1 to 1:2.

An additional aspect of the invention is the use of the composition as a defoamer additive, as a flow control additive and/or as a substrate wetting additive.

A further aspect of the invention is the use of the composition for producing dispersions, millbases, paints, coatings or printing inks, inkjet, grind resins, pigment concentrates, colour preparations, pigment preparations, filler preparations or coating compositions.

The coating compositions may be solvent-based, solvent-free or water-based coatings or printing ink.

The invention further provides for the use of the compounds according to formula (I) and formula (II) for producing a defoamer composition.

Having regard to the specific choice conditions for the polyether-modified polysiloxanes reference is made to the foregoing.

The examples which follow are provided merely to elucidate this invention to those skilled in the art and do not constitute any limitation of the described subject matter or of the described process whatsoever.

Test Methods:

Parameters or measurements are preferably determined using the methods described hereinbelow. These methods were in particular used in the examples of the present intellectual property right.

Viscosity (mPas)

Viscosity is measured according to DIN 53015 with a Höppler falling ball viscometer.

Compatibility

Compatibility is determined visually using a coating of the formulation to be tested (applied using a spiral film applicator (Erichsen K-Stab number 2)) on a film (Melinex 401 OW from Pütz Folien).

The evaluation is carried out according to the following scale (based on an area of 10×10 cm):
- 1=surface completely covered with defects
- 2=surface nearly completely covered with defects
- 3=surface with very many defects
- 4=surface with numerous defects
- 5=surface with isolated defects (up to 50)
- 6=surface with isolated defects (up to 30)
- 7=surface with few isolated defects (up to 20)
- 8=surface with few isolated defects (up to 10)
- 9=surface with very few isolated defects (1 to 5)
- 10=surface free from defects Defoamer Activity Defoamer activity is determined by means of a stirring test, 50 g of the formulation and the test amount of the defoamer (for example 0.2 g) are weighed into a plastic beaker for this purpose. The defoamer is incorporated for one minute at 1000 rpm using a stirrer (Dispermat type 60/2-457 from VMA Getzmann GmbH) having a toothed dissolver disc (diameter 3 cm, VMA Getzmann GmbH). The formulation is subsequently foamed for 2 minutes at 3000 rpm. 45 g of the formulation are then weighed into a 100 mL graduated glass measuring cylinder and the volume read off. A higher volume denotes a poorer defoamer activity.

Application

The respective coating compositions are applied to a film (Melinex 401 CW from Pütz Folien) with a spiral film applicator (Erichsen K-Stab number 2). Drying is effected at room temperature.

Further Conditions

Where in the context of the present invention values are reported in % these are % by weight values unless otherwise stated. In the case of compositions the values reported in % are based on the entire composition unless otherwise stated. Where reference is hereinbelow made to averages these are number averages unless otherwise stated. Where reference is hereinbelow made to measured values these measured values were determined at a pressure of 101 325 Pa, a temperature of 23° C. and ambient relative humidity of approx. 40% unless otherwise stated.

Materials and Equipment
- Dispermat type 60/2-457, VMA Getzmann GmbH
- Dissolver disc (diameter 3 cm), VMA Getzmann GmbH
- Spiral film applicator (K-Stab number 2), Erichsen
- Film (Melinex 401 CW), Pütz Folien
- K100 measuring instrument for static surface tension, Krüss
- BP 50 measuring instrument for dynamic surface tension, Krüss
- Speedmixer DAC 150 FVZ, Hauschild GmbH & Co. KG

COMPARATIVE EXAMPLES

Tego Foamex 810 from Evonik is a polyether polysiloxane, wherein the polyether units and the polysiloxane units are constructed in alternating blocks.

Tego Foamex 830 from Evonik is a polyether.

Tego Foamex 844 from Evonik is a polyether polysiloxane having terminal and lateral polyether modifications, wherein the polyether units are derived from ethylene oxides or propylene oxides. The polyether modification thus consists of at least two polyoxyalkylene blocks each consisting only of oxyethylene or oxypropylene units.

Tego Wet 285 from Evonik is a laterally modified polyether polysiloxane, wherein the polyoxyalkylene block is $-C_pH_{p2}O_2[(C_2H_4O)_x(C_3H_6O)_y]-$ where p=10.

Exemplary Embodiments

1. Production of the Inventive Defoamer Composition 1.1 Production of Component A 300 g of a siloxane of general formula $Me_3SiO(SiMeHO)_{6.5}(SiMe_2O)_{90}SiMe_3$ and 1745 g of an allyl polyether of general formula $CH_2=CHCH_2O[(C_2H_4O)_{13}(C_3H_6O)_{72}]-H$ were initially charged into a 4 L three-necked flask fitted with a reflux cooler and KPG stirrer. The mixture was stirred and heated to 90° C. A cloudy emulsion was obtained. Subsequently, 0.7 g of a solution of Karstedt's catalyst in decamethylcyclopentasiloxane was added to the mixture (w (Pt)=1.5%). An exothermic reaction set in and after about 40 min the reaction mixture cleared up markedly. The reaction mixture was then stirred at 90° C. for 4 hours. A cloudy, liquid product was obtained.

1.2 Production of Component B 200 g of a siloxane of general formula $HSiMe_2O(SiMeHO)_{2.7}(SiMe_2O)_{39.3}SiMe_2H$ and 468 g of an allyl polyether of general formula $CH_2=CHCH_2O[(C_2H_4O)_2(C_3H_3O)_{18}]-Me$ were initially charged into a 1 L three-necked flask fitted with a reflux cooler and KPG stirrer. The mixture was stirred and heated to 90° C. A cloudy emulsion is obtained. Subsequently, 0.25 g of a solution of Karstedt's catalyst in decamethylcyclopentasiloxane was added to the mixture (w (Pt)=1.5%). An exothermic reaction set in and after about 30 min the reaction mixture cleared up markedly. The reaction mixture was then stirred at 90° C. for 4 hours. A clear, liquid product was obtained.

1.3 Production Process 25 g of each of component A and component B are weighed into a 100 ml plastic container. The plastic beaker is sealed with a screw top and mixed in a Speedmixer at a speed of 2000 to 4000 rpm for two to six minutes. The inventive composition is now used for further testing.

2. Testing Compatibility and Defoamer Activity 2.1 Production of a Coating

To test compatibility and defoamer activity a coating according to Table 1 was initially produced.

A batch of solid resin solution was initially produced. To this end for a 3 kg batch the converted amount of water reported in Table 1 was initially charged in a 5 L stainless steel container and heated to 70° C. on a hotplate with stirring. The converted amounts of the remaining constituents reported in Table 1 are subsequently added portionwise. Stirring is continued until the solid resin has completely dissolved. The pH is adjusted to a value between 8 and 9 using amine.

To produce the coating with a 1 kg batch initially 400 g of the solid resin solution, 400 g of polymer dispersion and 130 g of water are mixed in a 2 litre stainless steel container with stirring. The wax dispersion, the film forming auxiliary and the retarder are then successively added with stirring. Finally, the rheology additive is added with stirring and the mixture is stirred for 20 minutes at medium shear. The coating is used for further testing.

2.2 Compatibility Testing 50 g of the coating and 0.3 g of the corresponding defoamer (inventive example from 1 and comparative examples) are weighed into a plastic beaker and incorporated at 1000 rpm for one minute using a stirrer (Dispermat type 60/2-457 from VMA Getzmann GmbH) having a toothed dissolver disc (diameter 3 cm, VMA Getzmann GmbH). This batch is subsequently foamed for 2 minutes at 3000 rpm. After standing for 24 h 2 mL of the batch were applied to a film as described above and visually evaluated.

The results are reported in Tables 2-3.

2.3 Defoamer Activity

As described above 50 g of the coating and 0.3 g of the corresponding defoamer (inventive example from 1 and comparative examples) are employed.

The results are reported in Tables 2-4.

TABLE 1

| Product | Manufacturer | | % by weight |
|---|---|---|---|
| Solid resin solution | | | |
| Joncryl 678 | BASF | Solid resin | 32 |
| Ammonia (25%) | | Amine | 8.9 |
| Water | | Solvent | 59.1 |
| Total | | | 100% |
| Coating | | | |
| Solid resin solution | | | 40 |
| Joncryl 90 | BASF | Polymer dispersion | 40 |
| Ultratube D816 | Keim Additec | Wax dispersion | 2 |
| Dowanol DPnB | Dow | Film former auxiliary | 2 |
| PEG 400 | | Retardant | 1 |
| TEGO ViscoPlus 3030 | Evonik | Rheology additive | 2 |
| Water | | Solvent | 13 |
| Total | | | 100 |

2.1 Results of the Inventive Composition

TABLE 2

| | Foam volume [mL/45 g] | Compatibility |
|---|---|---|
| Inventive composition of component A and component B | 47 | 7 |
| Component A | 69 | 10 |
| Component B | 50 | 1 |

The results were in each case converted into a graphic.

FIG. 1A describes the foam volumes for the inventive composition marked with a circle, for component A marked with a triangle and for component B marked with a square. The dashed line represents the probable foam volume to be expected according to the rule. The less foam volume is measurable the better the defoamer activity of the composition.

It was found that the inventive composition exhibits a much better defoamer activity than that of the two individual components. It lies outside the rule.

FIG. 1B describes the compatibility of the inventive composition, marked with a circle and of component B marked with a triangle. Component A is marked with a square. Here too, the value for the inventive composition lies outside the rule (dashed line).

2.2 Comparative Example 2

TABLE 3

| | Foam volume [mL/45 g] | Compatibility |
|---|---|---|
| TEGO Wet 285 | 93 | 8 |
| Tego Foamex 810 | 45 | 4 |
| TEGO Foamex 810:TEGO Wet 285, 1:2 | 61 | 5 |
| TEGO Foamex 810:TEGO Wet 285, 2:1 | 81 | 6 |

The results were in each case converted into a graphic.

Figure 2A:
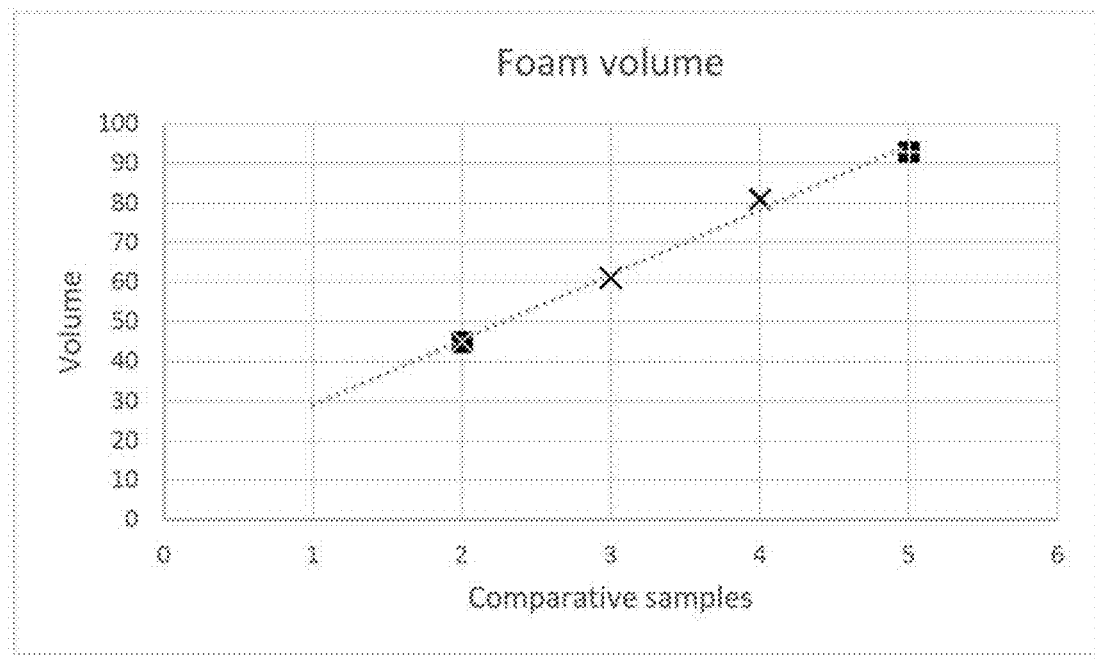
FIG. 2A shows a graph of the foam volume of TEGO Foamex 810, TEGO Wet 285, and two mixtures thereof.

FIG. 2A describes the foam volumes for the mixture of TEGO Foamex 810 and TEGO Wet 285 in two different ratios marked with a cross, for Tego Wet 285 marked with an X in a black square and for TEGO Foamex 810 marked with a cross in a black square. The dashed line indicated the rule.

It was found that the mixture of conventional defoamers showed a foam volume between the two values of the individual components. They lie virtually on a straight line.

Figure 2B:
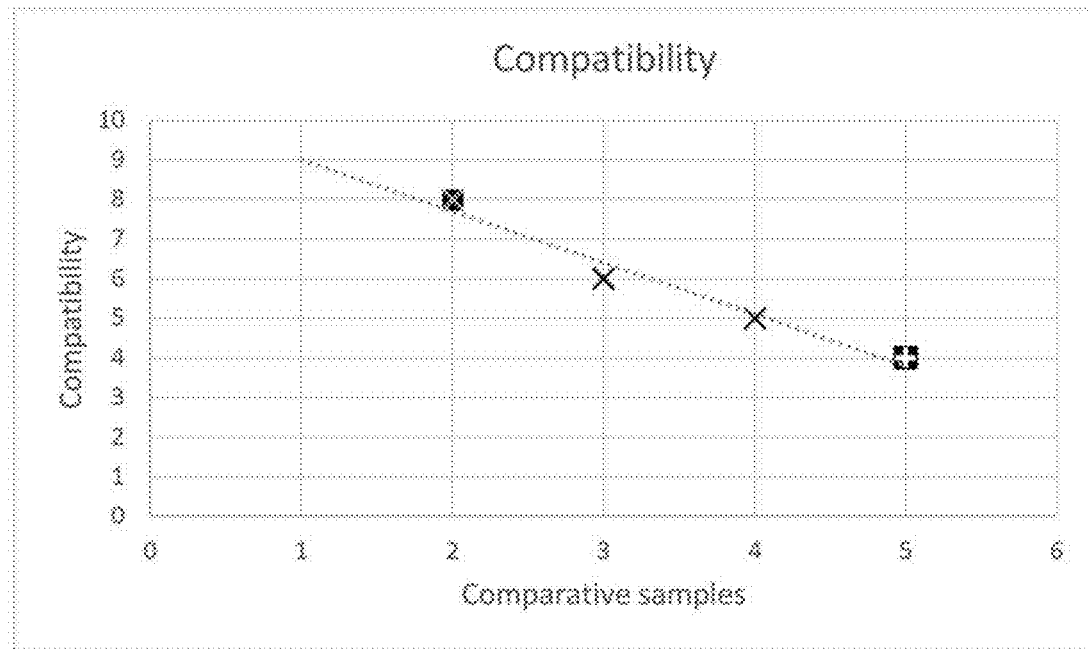
FIG. 2B shows a graph of the compatibility of TEGO Foamex 810, TEGO Wet 285, and two mixtures thereof.

FIG. 2B describes the compatibility for the mixture of TEGO Foamex 810 and TEGO Wet 285 in two different ratios marked with a cross, for Tego Foamex 810 marked with an X in a black square and for TEGO Wet 285 marked with a cross in a black square. The dashed line indicated the rule. Here too, the mixture conformed to the rule (dashed line).

2.3 Comparative Example 3

TABLE 4

| | Foam volume [mL/45 g] | Compatibility |
|---|---|---|
| TEGO Foamex 830 | 64 | 6 |
| TEGO Foamex 844 | 45 | 3 |
| TEGO Foamex 830:844 1:2 | 50 | 4 |
| TEGO Foamex 830:844 2:1 | 56 | 5 |

The results were in each case converted into a graphic.

FIG. 3A describes the foam volumes for the mixture of TEGO Foamex 830 and TEGO Foamex 844 in two different ratios marked with black diamonds, for Tego Foamex 844 marked with a white square and for TEGO Foamex 830 marked with a white circle. The dashed line indicated the rule.

It was found that the mixture of conventional defoamers showed a foam volume between the two values of the individual components. They lie virtually on a straight line.

FIG. 3B describes the compatibility for the mixture of TEGO Foamex 830 and TEGO Foamex 844 in two different ratios marked with black diamonds, for Tego Foamex 830 marked with a white circle and for TEGO Foamex 844 marked with a white square. The dashed line indicated the rule. Here too, the mixture conformed to the rule (dashed line).

The invention claimed is:

1. A defoamer composition based on organofunctionally modified polysiloxanes, comprising:

one or more laterally polyether-modified polysiloxanes as component A which conforms to general formula (I)

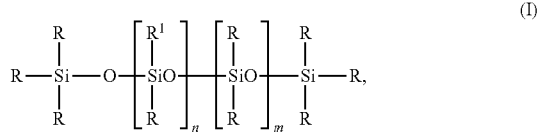

wherein

R=identical and/or different alkyl radicals having 1 to 8 carbon atoms, $R^1 = C_pH_{2p}O[(C_2H_4O)_x(C_3H_6O)_y]R^2$, wherein p=2, 3 or 4, and $R^2$=hydrogen and/or an alkyl radical having 1 to 3 carbon atoms, m=10-400, n=1 to 15, and wherein x and y are selected such that a molar weight of the polyoxyalkylene block $—C_pH_{2p}O[(C_2H_4O)_x(C_3H_6O)_y]—$ is in the range of 500-10000 g/mol, and at least one terminally polyether-modified polysiloxane as component B.

2. The composition according to claim 1, wherein the organofunctionally modified polysiloxanes are linear organofunctionally modified polysiloxanes.

3. The composition according to claim 1, wherein component B conforms to general formula (II)

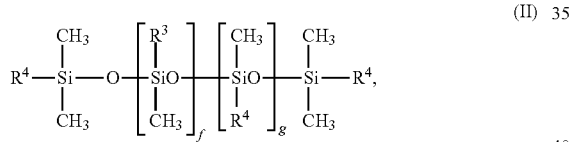

wherein $R^3$=identical and/or different alkyl radicals having 1 to 8 carbon atoms, $R^4 = R^3$ and/or $—C_pH_{2p}O[(C_2H_4O)_x(C_3H_6O)_y]R^2$ and/or $—C_pH_2O(C_3H_6O)_y]R^2$, wherein p=2, 3 or 4, with the proviso that at least one $R^4 = —C_pH_{2p}O[(C_2H_4O)_x(C_3H_6O)_y]—$ or $—C_pH_{2p}O(C_3H_6O)_y]—$ is terminal, $R^2$=alkyl radical having 1 to 3 carbon atoms and/or hydrogen, f=20-500, g=1 to 15, and wherein x and y are selected such that the molar weight of the polyoxyalkylene block $—C_pH_{2p}O[(C_2H_4O)_x(C_3H_6O)_y]—$ and/or $—C_pH_{2p}O(C_3H_6O)_y]—$ is in the range of 200-4000 g/mol.

4. The composition according to claim 1, wherein y>x in the polyoxyalkylene block $—C_pH_{2p}O[(C_2H_4O)_x(C_3H_6O)_y]—$, and wherein x and y are natural numbers.

5. The composition according to claim 1, wherein the polyoxyalkylene block $—C_pH_{2p}O[(C_2H_4O)_x(C_3H_6O)_y]—$ in component A has a blockwise construction.

6. The composition according to claim 3, wherein $R^4 = C_pH_{2p}O[(C_2H_4O)_x(C_3H_6O)_y]R^2$ and/or $—C_pH_{2p}((C_3H_6O)_y]R^2$, wherein p=2, 3 or 4, with the proviso that at least one $R^4 = —C_pH_{2p}O[(C_2H_4O)_x(C_3H_6O)_y]—$ or $—C_pH_{2p}O(C_3H_6O)_y]—$ is terminal.

7. The composition according to claim 1, wherein a molar ratio of siloxane fraction to polyoxyalkylene fraction of component A is smaller than a molar ratio of siloxane fraction to polyoxyalkylene fraction of component B.

8. The composition according to claim 1, wherein component A has a molar ratio of siloxane fraction to polyoxyalkylene fraction of 0.15 to 0.35.

9. The composition according to claim 1, wherein component A has a viscosity in the range of 2500-60 000 mPas, measured according to DIN 53015.

10. The composition according to claim 1, wherein component B has a molar ratio of siloxane fraction to polyoxyalkylene fraction of 0.4 to 2.

11. The composition according to claim 1, wherein component B has a viscosity in the range of 250-1200 mPas, measured according to DIN 53015.

12. The composition according to claim 1, wherein component A has a higher compatibility than component B.

13. The composition according to claim 1, wherein component B has a higher defoamer activity than component A.

14. The composition according to claim 1 obtainable by stirring components A and B.

15. The composition according to claim 1, consisting of:

(a) 20% to 80% by weight of component A, (b) 20% to 80% by weight of component B, and (c) 0% to 70% by weight of a component B';

and wherein component B and component B' conform to general formula (II)

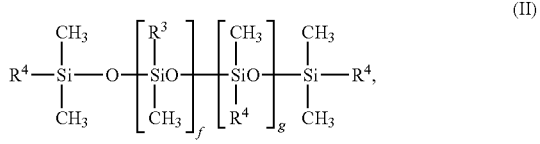

wherein $R^3$=identical and/or different alkyl radicals having 1 to 8 carbon atoms, $R^4 = R^3$ and/or $—C_pH_{2p}O[(C_2H_4O)_x(C_3H_6O)_y]R^2$ and/or $—C_pH_{2p}(C_3H_6O)_y]R^2$, wherein p=2, 3 or 4, with the proviso that at least one $R^4 = —C_pH_{2p}O[(C_2H_4O)_x(C_3H_6O)_y]—$ or $—C_pH_{2p}O(C_3H_6O)_y]—$ is terminal, $R^2$=alkyl radical having 1 to 3 carbon atoms and/or hydrogen, f=20-500, g=1 to 15, and wherein x and y are selected such that the molar weight of the polyoxyalkylene block $—C_pH_{2p}O[(C_2H_4O)_x(C_3H_6O)_y]—$ and/or $—C_pH_{2p}O(C_3H_6O)_y]—$ is in the range of 200-4000 g/mol;

wherein in Component B, at least one polyoxyalkylene block $—C_pH_2>O[(C_2H_4O)_x(C_3H_6O)_y]—$ is terminal, wherein in Component B', at least one polyoxyalkylene block —$C_pH_{2p}O(C_3H_6O)_y$]— is terminal, and wherein the amounts of components A, B and B' sum to 100% by weight and are based on the composition.

16. The composition according to claim 15, obtainable by stirring component A into a mixture of components B and B'.

17. The composition according to claim 1, wherein the composition has a viscosity of 250 to 5000 mPas, measured according to DIN 53015.

18. The composition according to claim 1, wherein the composition has a static surface tension of 20 to 65 mN/m, measured with a Krüss K100 measuring instrument for static surface tension on the basis of DIN EN 14370:2004; and a dynamic surface tension of 20 to 65 mN/m, measured with a Krüss BP 50 bubble pressure tensiometer on the basis of DIN EN 14370:2004.

19. An article comprising the composition according to claim 1,
wherein the article is a defoamer additive, a flow control additive, and/or a substrate wetting additive.

20. A method, comprising:
producing an article comprising the composition according to claim 1,
wherein the article is selected from the group consisting of dispersions, millbases, paints, coatings, printing inks, inkjet, grind resins, pigment concentrates, colour preparations, pigment preparations, filler preparations, and coating compositions.

21. A method of producing the defoamer composition according to claim 1, the method comprising:
mixing component A with component B,
and
wherein component B conforms to general formula (II)

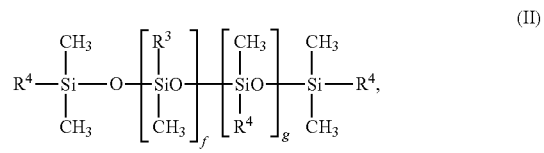

(II)

wherein
$R^3$=identical and/or different alkyl radicals having 1 to 8 carbon atoms,
$R^4=R^3$ and/or —$C_pH_{2p}O[(C_2H_4O)_x(C_3H_6O)_y]R^2$ and/or —$C_pH_{2p}(C_3H_6O)_y]R^2$,
wherein p=2, 3 or 4, with the proviso that at least one $R^4$=—$C_pH_{2p}O[(C_2H_4O)_x(C_3H_6O)_y]$— or —$C_pH_{2p}O(C_3H_6O)_y]$— is terminal,
$R^2$=alkyl radical having 1 to 3 carbon atoms and/or hydrogen,
f=20-500,
g=1 to 15, and
wherein x and y are selected such that the molar weight of the polyoxyalkylene block —$C_pH_{2p}O[(C_2H_4O)_x(C_3H_6O)_y]$— and/or —$C_pH_{2p}O(C_3H_6O)_y]$— is in the range of 200-4000 g/mol.

* * * * *